(12) United States Patent
Tanaka et al.

(10) Patent No.: US 10,759,285 B2
(45) Date of Patent: Sep. 1, 2020

(54) POWER SUPPLY SYSTEM (71) Applicant: NISSAN MOTOR CO., LTD., Yokohama-shi, Kanagawa (JP)

(72) Inventors: Koichi Tanaka, Kanagawa (JP); Motoharu Nishio, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/343,142

(22) PCT Filed: Oct. 21, 2016

(86) PCT No.: PCT/JP2016/081298
§ 371 (c)(1),
(2) Date: Apr. 18, 2019

(87) PCT Pub. No.: WO2018/073961
PCT Pub. Date: Apr. 26, 2018

(65) Prior Publication Data
US 2019/0319474 A1 Oct. 17, 2019

(51) Int. Cl.
H02J 7/02 (2016.01)
B60L 50/75 (2019.01)
B60L 53/20 (2019.01)
H02J 7/00 (2006.01)
H02M 3/335 (2006.01)
B60L 50/60 (2019.01)
B60K 6/22 (2007.10)
H02J 7/35 (2006.01)
H02M 1/14 (2006.01)

(52) U.S. Cl.
CPC ............. *B60L 50/75* (2019.02); *B60L 50/60* (2019.02); *B60L 53/20* (2019.02); *H02J 7/0042* (2013.01); *H02J 7/022* (2013.01); *H02M 3/33569* (2013.01); *B60K 6/22* (2013.01); *B60L 2210/30* (2013.01); *B60Y 2200/91* (2013.01); *B60Y 2200/92* (2013.01); *H02J 7/35* (2013.01); *H02M 1/14* (2013.01)

(58) Field of Classification Search
CPC ........................................................ H02J 7/02
See application file for complete search history.

(56) References Cited

U.S. PATENT DOCUMENTS 8,664,904 B2 3/2014 Suzuki
2009/0289589 A1 11/2009 Fujino et al.
(Continued)

FOREIGN PATENT DOCUMENTS

CN 103457312 A 12/2013
JP 09-065509 A 3/1997
(Continued)

Primary Examiner — Robert Grant
(74) Attorney, Agent, or Firm — Foley & Lardner LLP (57) ABSTRACT A power supply system includes a battery, a charger that converts a voltage of power input from an external power supply through a charging port into a voltage required for charge of the battery and an intra-system power supply device that is connected between the charging port and the charger. The power supply device is provided with a voltage converter that converts a voltage of output power of the power supply device into a voltage corresponding to the voltage of the external power supply.

21 Claims, 6 Drawing Sheets (56) References Cited

U.S. PATENT DOCUMENTS

| | | | |
|---|---|---|---|
| 2012/0153878 A1* | 6/2012 | King | B60L 53/16 318/139 |
| 2012/0261217 A1* | 10/2012 | Agirman | B66B 5/027 187/290 |
| 2013/0320911 A1 | 12/2013 | Kamiya et al. | |
| 2015/0311831 A1 | 10/2015 | Yamada et al. | |

FOREIGN PATENT DOCUMENTS

| | | |
|---|---|---|
| JP | 2009-140706 A | 6/2009 |
| JP | 2009-225568 A | 10/2009 |
| JP | 2010-004732 A | 1/2010 |
| JP | 2012-125048 A | 6/2012 |
| JP | 2013-070546 A | 4/2013 |
| JP | 2013-150497 A | 8/2013 |
| JP | 2014-003863 A | 1/2014 |
| JP | 2014-027857 A | 2/2014 |

* cited by examiner

FIG. 1

| UPPER LIMIT VOLTAGE OF AUXILIARY POWER SUPPLY | INPUT VOLTAGE OF CHARGER | TYPE OF DC/DC CONVERTER | AUXILIARY POWER SUPPLY'S EARTH |
|---|---|---|---|
| SMALLER THAN DC60V | OUTSIDE RANGE WHERE BOOSTING IS POSSIBLE | INSULATING CONVERTER | CHASSIS |
| | INSIDE RANGE WHERE BOOSTING IS POSSIBLE | | |
| DC60V OR HIGHER | OUTSIDE RANGE WHERE BOOSTING IS POSSIBLE | NON-INSULATING CONVERTER | DEDICATED EARTH |
| | INSIDE RANGE WHERE BOOSTING IS POSSIBLE | — | |

POWER SUPPLY SYSTEM

TECHNICAL FIELD

The present invention relates to a power supply system that charges a battery by using power input from outside, and to a method for controlling the power supply system.

BACKGROUND ART

In general, an electric vehicle is provided with a charger that converts a voltage input from an external power supply and charges a battery. For example, in JP2013-150497A, a system is disclosed in which power is supplied to a battery from an auxiliary power supply such as a solar cell through a charger by switching a connection destination of the charger from an external power supply to the auxiliary power supply.

SUMMARY OF INVENTION

In the system described above, when, for example, a voltage of output power of the auxiliary power supply included in the power supply device is out of a range of a voltage that can be input to the charger, the charger stops operating. Therefore, even in a situation where the battery needs to be charged, power of the power supply device is not supplied to the battery.

On the contrary, it is possible to directly connect a converter between an auxiliary power supply and a battery, the converter converting a voltage of output power of the auxiliary power supply into a voltage required for charge of the battery, so that the battery is charged. However, there is a problem that a size and cost of the converter becomes large in order to convert a voltage of output power of the auxiliary power supply to a voltage of the battery.

The present invention has been accomplished in light of these problems, and an object of the present invention is to provide a power supply system and a method for controlling the power supply system. The power supply system suppresses a size and cost of a converter that converts an output voltage of a power supply device while ensuring that a battery is charged by the power supply device in a situation where the battery needs to be charged.

According to an aspect of this invention, a power supply system provided with a battery, and a charger that converts a voltage of power input from an external power supply through a charging port into a voltage required for charge of the battery includes an intra-system power supply device that is connected between the charging port and the charger. The power supply device is provided with a voltage converter that converts a voltage of output power of the power supply device into a voltage corresponding to the voltage of the external power supply.

DESCRIPTION OF EMBODIMENTS

Hereinafter, embodiments of the present invention are described with reference to the attached drawings.

First Embodiment

Figure 1:
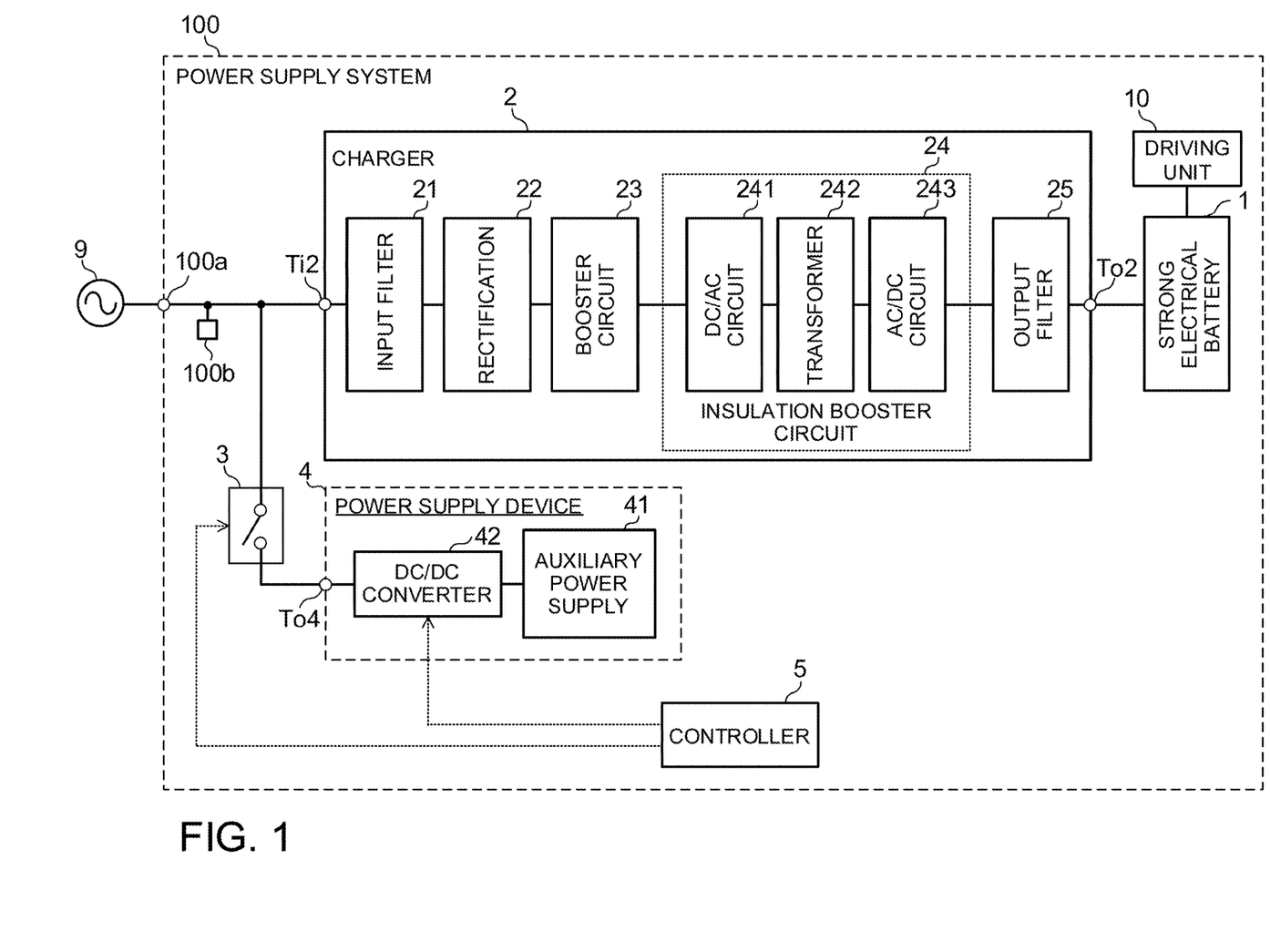
FIG. 1 is a block diagram showing an example of a configuration of a power supply system according to a first embodiment of the present invention.

FIG. 1 is a block diagram showing an example of a configuration of a power supply system 100 according to a first embodiment of the present invention.

The power supply system 100 is provided in, for example, a moving body that is an object that itself moves. The moving body on which the power supply system 100 is mounted includes, for example, a vehicle such as an electric vehicle including a hybrid vehicle, and an electric train, as well as a plane, and a ship.

The power supply system 100 is a charging system that receives power supplied from an external power supply 9 and charges a high voltage battery 1 by using the power. The power supply system 100 is provided with a charging port 100a in order to electrically connect the external power supply 9 with the power supply system 100.

Further, the power supply system 100 is provided with a detector 100b that detects a voltage or a current input from the external power supply 9. For example, the detector 100b detects a voltage or a current input from the external power supply 9, and outputs a detected value to a controller 5.

The external power supply 9 is a power supply that is provided outside the power supply system 100 and supplies power of a direct current DC or an alternating current AC to a load. The external power supply 9 is, for example, a commercial power supply that outputs power at an alternating current voltage of several hundreds of volts (V). The external power supply 9 according to the embodiment supplies power to an inside of the power supply system 100 at an alternating current voltage of 100V or 200V through the charging port 100a.

The external power supply 9 is provided with a so-called charging gun that is an interface to be connected with the charging port 100a, and the charging gun of the external power supply 9 is engaged with the charging port 100a. The charging port 100a is provided with an engagement sensor that detects whether or not the charging gun of the external power supply 9 is engaged, and an output signal of the engagement sensor is input to the controller 5. The engagement sensor estimates whether or not a voltage of power supplied from the external power supply 9 is input.

The power supply system 100 according to the embodiment is mounted on a vehicle, and supplies power to a driving unit 10 that drives the vehicle. The driving unit 10 includes, for example, an electric motor and an inverter that converts direct current power of the high voltage battery 1 into alternating current power to be supplied to the electric motor.

The power supply system 100 is provided with the high voltage battery 1, the charger 2, a switch 3, a power supply device 4, and the controller 5. The power supply device 4 is provided with an auxiliary power supply 41 and a DC/DC converter 42.

The high voltage battery 1 is a power supply that supplies power to the driving unit 10. The high voltage battery 1 according to the embodiment is a so-called direct current power supply for a high voltage system, the direct current power supply outputting power at a direct current voltage of several hundreds of volts (V). The high voltage battery 1 outputs, for example, a voltage of about 400V. The high voltage battery 1 is realized with a lithium ion battery, a lead battery, and so on.

The charger 2 is an electric circuit that converts a voltage of power input from the external power supply 9 and charges the high voltage battery 1. This means that the charger 2 converts a voltage of input power into a predetermined charging voltage required for charge of the high voltage battery 1, and outputs the converted voltage to the high voltage battery 1. The charger 2 is, for example, a vehicle mounted charger.

An alternating current voltage of power supplied from the external power supply 9 is input to an input terminal Ti2 of the charger 2. The charger 2 converts the voltage of the input power into a direct current voltage, and also converts the voltage of the input power into a charging voltage value of the high voltage battery 1. For example, in an input voltage range of the charger 2, a lower limit value is AC85V and an upper limit value is AC264V. The charger 2 is able to operate even when a direct current voltage is input. Also, when a voltage outside the input voltage range is applied to the charger 2, the charger 2 does not carry out a boost operation.

The charger 2 according to the embodiment is provided with an input filter 21, a rectification circuit 22, a booster circuit 23, an insulation booster circuit 24, and an output filter 25.

The input filter 21 is an electric circuit that removes a noise component of an alternating current voltage signal of power that is input to the input terminal Ti2 of the charger 2 from the external power supply 9. The input filter 21 outputs the alternating current voltage signal, from which the noise component is removed, to the rectification circuit 22.

The rectification circuit 22 configures an AC/DC circuit that converts an input voltage of an alternating current AC into an output voltage of a direct current DC. For example, the rectification circuit 22 converts a sine wave of an alternating current voltage signal that is output from the input filter 21 into a half-rectified waveform or a full-rectified waveform. The rectification circuit 22 outputs a rectified voltage signal to the booster circuit 23.

The booster circuit 23 is an electric circuit that boosts a level of a voltage signal supplied from the rectification circuit 22 to a predetermined voltage value. The booster circuit 23 outputs the boosted voltage signal to the insulation booster circuit 24.

The booster circuit 23 is realized with, for example, a PFC (power factor correction) circuit. A boosting ratio of the booster circuit 23 can be changed and is controlled by, for example, the controller 5. The boosting ratio herein means a ratio of an output voltage to an input voltage in the booster circuit 23.

The insulation booster circuit 24 is an electric circuit that electrically insulates the booster circuit 23 and the output filter 25 from each other, and boosts a level of a voltage signal of power supplied from the booster circuit 23 to a charging voltage value for the high voltage battery 1. A boosting ratio in the insulation booster circuit 24 is set to a fixed value.

The insulation booster circuit 24 is provided with a DC/AC circuit 241, a transformer 242, and an AC/DC circuit 243.

The DC/AC circuit 241 converts a voltage signal of a direct current DC supplied from the booster circuit 23 into a voltage signal of an alternating current AC. The DC/AC circuit 241 outputs a converted voltage signal of the alternating current AC to the transformer 242.

The transformer 242 is made of a pair of windings. The transformer 242 insulates the voltage signal of the alternating current AC output from the DC/AC circuit 241 from the AC/DC circuit 243, and, by using induced electromotive force generated by the voltage signal of the alternating current AC, the transformer 242 generates a high voltage signal of an alternating current AC with a level higher than the voltage signal of the alternating current AC. The transformer 242 outputs the high voltage signal of the alternating current AC to the AC/DC circuit 243.

The AC/DC circuit 243 converts the high voltage signal of the alternating current AC taken out from the transformer 242 into a high voltage signal of a direct current DC. The AC/DC circuit 243 outputs the converted high voltage signal to the output filter 25.

As described above, the insulation booster circuit 24 insulates the external power supply 9 from the high voltage battery 1 by using the transformer 242, and also increases a level of a voltage signal of power supplied from the external power supply 9 to a charging voltage of the high voltage battery 1.

The output filter 25 is an electric circuit that removes a noise component of the high voltage signal output from the AC/DC circuit 243. The output filter 25 outputs the high voltage signal of the direct current DC, from which the noise component is removed, to an output terminal To2 of the charger 2. Due to this, the high voltage signal of the direct current DC is supplied to the high voltage battery 1, and the high voltage battery 1 is charged.

The switch 3 connects or disconnects the output terminal To4 of the power supply device 4 with or from the input terminal Ti2 of the charger 2 in order to avoid an electric shock of a driver and so on while a vehicle is parked. The switching of the switch 3 is carried out by the controller 5. For example, while the vehicle is running, a state of the switch 3 is switched from a disconnected state to a connected state so that the high voltage battery 1 is charged by using power of the power supply device 4 depending on a size of a residual capacitance of the high voltage battery 1.

The power supply device 4 is an intra-system power supply device and supplies power to the high voltage battery 1 through the charger 2. The power supply device 4 is provided with an auxiliary power supply 41 and a DC/DC converter 42. The power supply device 4 is connected between the charging port 100a and the charger 2. The power supply device 4 may be connected with the charging port 100a itself or may be connected with the charger 2 itself.

The auxiliary power supply 41 is a power supply for supplementing power of the high voltage battery 1. For example, the auxiliary power supply 41 generates power with a direct current voltage of several tens of volts or several hundreds of volts. The auxiliary power supply 41 is, for example, a direct current power supply such as a fuel cell, a solar cell, and a secondary cell.

In the embodiment, the auxiliary power supply 41 outputs a voltage at a level different from that of a voltage of the high voltage battery 1. A value of the voltage of the auxiliary power supply 41 is also different form a voltage of the external power supply 9. The auxiliary power supply 41 is made of a solid oxidation type fuel cell. A magnitude of an output voltage of the fuel cell changes in accordance with an operating condition such as a flow rate of anode gas supplied to the fuel cell, a flow rate of cathode gas, and temperature of the fuel cell. An upper limit value of the output voltage of the fuel cell is lower than an effective value and a mean value of the voltage of the external power supply 9.

The DC/DC converter 42 configures a voltage converter that is connected between the auxiliary power supply 41 and the charger 2, and converts a voltage of power output from the power supply device 4 into a voltage value corresponding to the voltage of the external power supply 9, that means a voltage value that can be boosted at the charger 2. The DC/DC converter 42 is a circuit that boosts or steps down a voltage of the auxiliary power supply 41.

The DC/DC converter 42 according to the embodiment boosts a voltage of output power of the auxiliary power supply 41 up to a predetermined voltage value within the input voltage range of the charger 2. The DC/DC converter 42 is controlled by the controller 5.

The controller 5 switches a connection state of the switch 3 and also controls an operation of the DC/DC converter 42.

The controller 5 determines whether or not the external power supply 9 is separated from the charging port 100a of the power supply system 100. Specifically, the controller 5 determines whether or not the external power supply 9 is separated from the charging port 100a in accordance with detection signals of the engagement sensor provided in the charging port 100a, the detector 100b, and so on. For example, when the detection signal of the detector 100b is lower than a predetermined threshold value, the controller 5 determines that the external power supply 9 is separated from the charging port 100a.

When the external power supply 9 is separated from the charging port 100a, the controller 5 switches a state of the switch 3 from the disconnected state to the connected state. Then, the controller 5 controls the DC/DC converter 42 so that a voltage of output power of the auxiliary power supply 41 is boosted to a voltage value within the input voltage range of the charger 2. The input voltage range of the charger 2 means an input voltage that can be boosted by the charger 2.

Meanwhile, when the external power supply 9 is connected with the charging port 100a of the power supply system 100, the controller 5 switches the switch 3 to the disconnected state and stops the operation of the DC/DC converter.

Alternatively, a capacitance sensor that detects a residual capacitance of the high voltage battery 1 may be provided around the high voltage battery 1, and the controller 5 may switch the connection state of the switch 3 in accordance with a detection signal of the capacitance sensor. In this case, when the detection signal of the capacitance sensor is lower than a predetermined charge threshold value, the controller 5 switches the switch 3 from the disconnected state to the connected state. When the detection signal is higher than a predetermined full-charge threshold value, the controller 5 switches the switch 3 to the disconnected state.

Figure 2:
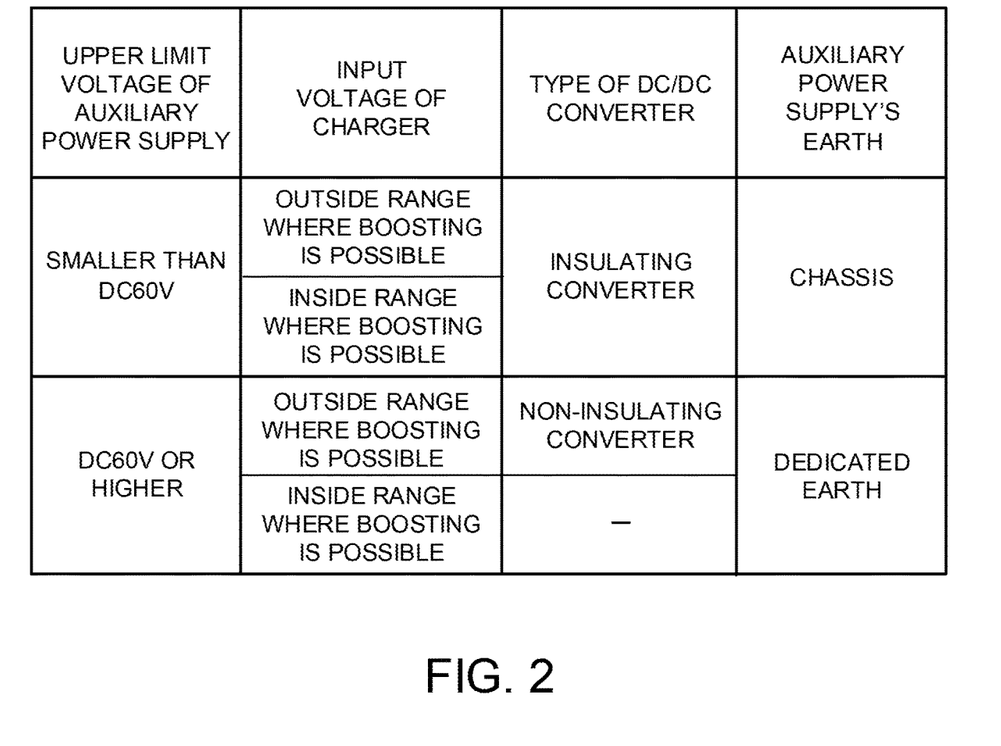
FIG. 2 is a view explaining a relation between a voltage of output power of a power supply device and an insulation type of a DC/DC converter.

FIG. 2 is a view explaining a relation between a voltage of an output power of the auxiliary power supply 41 and a type of the DC/DC converter 42 according to the embodiment. Here, it is assumed that the DC/DC converter 42 boosts a voltage to be input to the charger 2 to a voltage higher than 60V.

As shown in FIG. 2, a configuration of the DC/DC converter 42 is selected based on a direct current DC of 60V in accordance with safety rules for preventing direct contact.

When an upper limit value of an output voltage (an upper limit voltage) of the auxiliary power supply 41 is lower than 60V, and the upper limit voltage of the auxiliary power supply 41 is outside the input voltage range of the charger 2, the DC/DC converter 42 is used to boost a voltage of output power of the auxiliary power supply 41 to an input voltage value that can be boosted by the charger 2. In such a case, an insulating converter including a transformer configures the DC/DC converter 42.

Even when the upper limit voltage of the auxiliary power supply 41 is lower than 60V, and the upper limit voltage of the auxiliary power supply 41 is within the input voltage range of the charger 2, an insulating converter including a transformer configures the DC/DC converter 42 in order to insulate the auxiliary power supply 41 and the charger 2 from one another.

Figure 3:
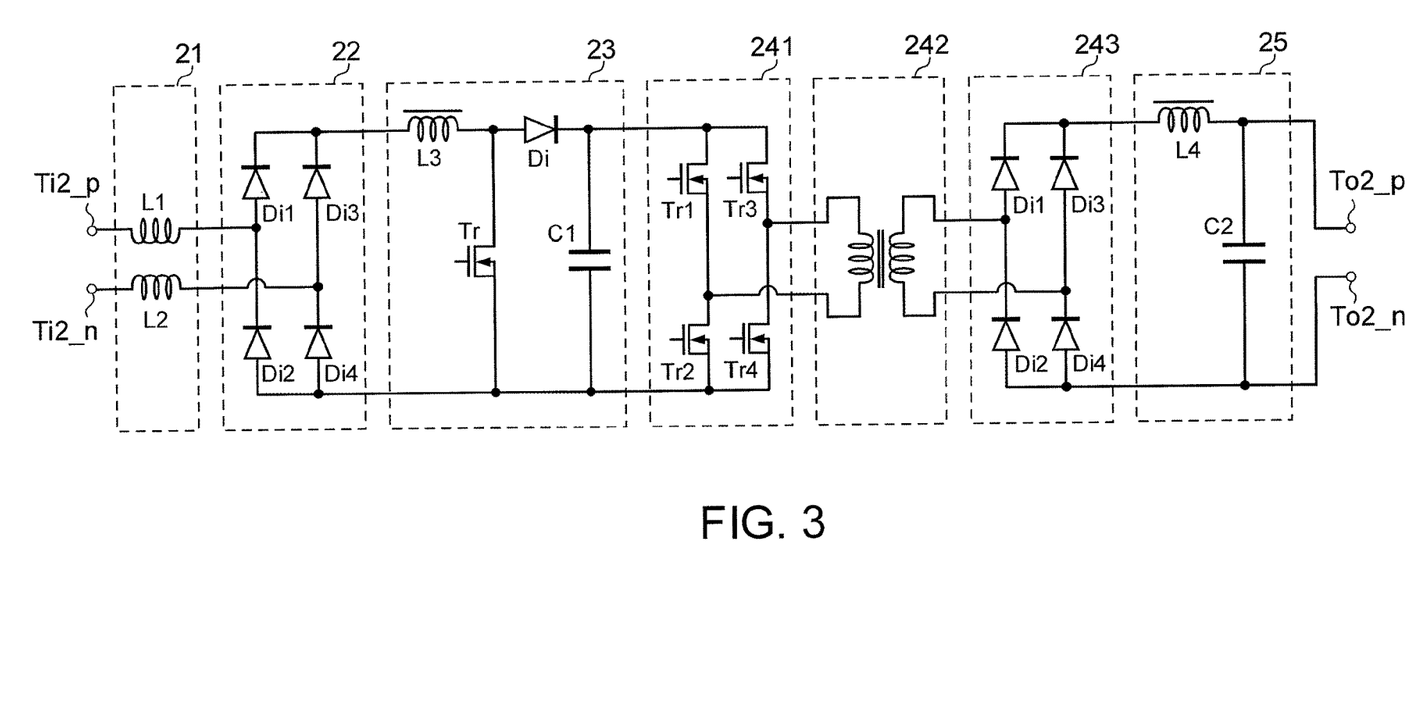
FIG. 3 is a circuit diagram showing a configuration example of a charger included in the power supply system.

Meanwhile, when the upper limit voltage of the auxiliary power supply 41 is equal to or higher than 60V, and a voltage of output power of the auxiliary power supply 41 is outside the input voltage range of the charger 2, necessity to insulate a primary side and a secondary side from each other is low, and a non-insulating converter without a transformer configures the DC/DC converter 42. In such a case, parts such as the transformer 242 shown in FIG. 3 are not necessary, and it is thus possible to reduce product cost of the DC/DC converter 42 compared to an insulating converter.

When the upper limit voltage of the auxiliary power supply 41 is equal to or higher than 60V, and the upper limit voltage of the auxiliary power supply 41 is within the input voltage range of the charger 2, the DC/DC converter 42 is not necessary.

As described above, when the upper limit voltage of the auxiliary power supply 41 is equal to or higher than 60V, a non-insulating converter is used as the DC/DC converter 42, and it is thus possible to reduce product cost and a size of the DC/DC converter 42 compared to a case where an insulating converter is used.

Further, when the upper limit voltage of the auxiliary power supply 41 is smaller than 60V, a negative electrode of the auxiliary power supply 41 is grounded (earthed) to a chassis. Meanwhile, when the upper limit voltage of the auxiliary power supply 41 is equal to or higher than 60V, a positive electrode and the negative electrode of the auxiliary power supply 41 need to be floated from the chassis due to safety rules. Therefore, when the upper limit voltage of the auxiliary power supply 41 is lower than 60V, the chassis can be used as an electric passage by connecting the negative electrode of the auxiliary power supply 41 with the chassis, and it is thus possible to simplify a circuit configuration on the negative electrode side of the power supply device 4 compared to the circuit configuration in which the auxiliary power supply 41 is floated from the chassis.

Therefore, the non-insulating DC/DC converter 42 may be used, or the chassis may be used as the negative electrode of the auxiliary power supply 41 depending on a voltage of output power of the auxiliary power supply 41, so that product cost and a size of the power supply device 4 are reduced.

FIG. 3 is a circuit diagram showing a configuration example of the charger 2 according to the embodiment.

In FIG. 3, a positive electrode input terminal Ti2_p and a negative electrode input terminal Ti2_n are shown as the input terminal Ti2 of the charger 2, and a positive electrode output terminal To2_p and a negative electrode output terminal To2_n are shown as the output terminal To2 of the charger 2.

The input filter 21 is provided with the windings L1 and L2 for removing noise, one end of the winding L1 is connected with the positive electrode input terminal Ti2_p, and one end of the winding L2 is connected with the negative electrode input terminal Ti2_n. By using the two windings L1 and L2 as described above, it is possible to allow not only an alternating current voltage but also a direct current voltage to pass while removing noise.

The rectification circuit 22 is an electric circuit provided with four diodes Di1 to Di4 and configures a half-wave rectification circuit. In the rectification circuit 22, the two diodes Di1 and Di2 connected in series, and the two diodes Di3 and Di4 connected in series are connected with each other in parallel. Then, the other end of the winding L1 is connected with a point of contact between the diode Di1 and the diode Di2, and the other end of the winding L2 is connected with a point of contact between the diode Di3 and the diode Di4.

In the rectification circuit 22, a signal component in a negative direction in an alternating current voltage signal is removed, and a direct current signal is generated. The rectification circuit 22 only needs to be a circuit that converts an alternating current into a direct current, and may be a bridge-type or a center tap-type full-wave rectification circuit.

The booster circuit 23 is provided with a transistor Tr for boosting an input voltage, a winding L3, a diode Di, and a capacitor C1. The winding L3 and the diode Di are connected with a positive electrode line, and the transistor Tr and the capacitor C1 are connected in parallel between the positive electrode line and a negative electrode line.

In the booster circuit 23, a PWM (pulse width modulation) signal is supplied to a control terminal of the transistor Tr, and the transistor Tr performs a switching operation. Thus, energy is stored in the winding L3, and an electric current is supplied from the winding L3 to the capacitor C1 through the diode Di.

At the same time, a voltage signal input to the winding L3 from the rectification circuit 22 is converted into a fixed voltage signal by the diode Di and the capacitor C1. By changing a duty ratio of the PWM signal supplied to the control terminal of the transistor Tr, a boosting ratio of the booster circuit 23 changes.

The DC/AC circuit 241 is provided with four transistors Tr1 to Tr4, and the two transistors Tr1 and Tr2 connected in series and the two transistors Tr3 and Tr4 connected in series are connected with each other in parallel. Then, one end of a primary winding in the transformer 242 is connected with a point of contact between the transistor Tr1 and the transistor Tr2, and the other end of the primary winding in the transformer 242 is connected with a point of contact between the transistor Tr3 and the transistor Tr4.

Because a PWM signal is supplied to all of control terminals of the transistors Tr1 to Tr4, a voltage signal of a direct current DC that is input to the DC/AC circuit 241 from the booster circuit 23 is converted into a voltage signal of an alternating current AC.

The transformer 242 is provided with the primary winding and a secondary winding for generating mutual induction. The transformer 242 insulates the DC/AC circuit 241 and the AC/DC circuit 243 from each other, and, at the same time, outputs an alternating current voltage from the secondary winding to the AC/DC circuit 243, the alternating current voltage having an amplitude larger than that of an alternating current voltage input to the primary winding from the DC/AC circuit 241.

Similarly to the rectification circuit 22, the AC/DC circuit 243 is provided with four diodes Di1 to Di4 and configures a bridge-type full-wave rectification circuit. The AC/DC circuit 243 converts all cycles of the alternating current voltage signal into a signal in the same direction, and generates a rectifying signal showing a full-rectified waveform.

In the AC/DC circuit 243, the two diodes Di1 and Di2 connected in series and two diodes Di3 and Di4 connected in series are connected with each other in parallel. Also, one end of the secondary winding in the transformer 242 is connected with a point of contact between the diode Di1 and the diode Di2, and the other end of the secondary winding in the transformer 242 is connected with a point of contact between the diode Di3 and the diode Di4.

As described above, the insulation booster circuit 24 boosts an input voltage with a predetermined boosting ratio and outputs the boosted voltage to the output filter 25. The boosting ratio herein means a ratio that is obtained by dividing an output voltage by an input voltage of the insulation booster circuit 24.

The output filter 25 is provided with a winding L4 and a capacitor C2 for smoothing an input signal. The output filter 25 smooths a rectifying signal input to the winding L4 from the AC/DC circuit 243, and also removes ripple noise.

Since a level of a voltage signal output from the output filter 25 is boosted to a voltage value required for charge of the high voltage battery 1, the high voltage battery 1 is charged at an output voltage of the output filter 25.

As described above, the charger 2 converts an alternating current voltage of input power into a direct current voltage, and boosts the converted direct current voltage to a predetermined value in consideration of a boosting ratio of the insulation booster circuit 24. Then, the charger 2 uses mutual induction in the transformer 242 and boosts the boosted direct current voltage to a voltage value required for charge of the high voltage battery 1. Thus, it is possible to charge the high voltage battery 1 by using input power supplied to the charger 2.

Figure 4:
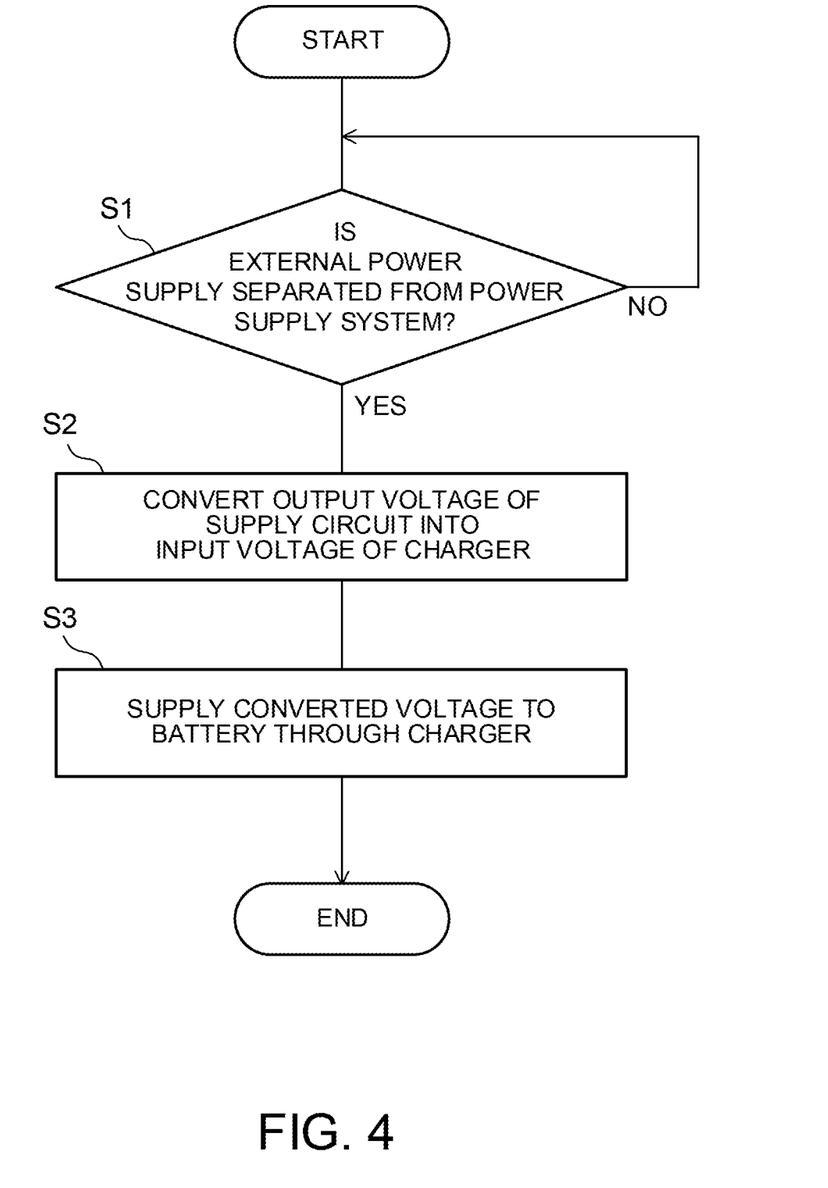
FIG. 4 is a flowchart showing an example of a processing procedure with regard to a method for controlling the power supply system according to the embodiment.

FIG. 4 is a flowchart showing an example of a processing procedure with regard to a method for controlling the power supply system 100 according to the embodiment. The controller 5 is programmed so as to execute various types of processing with regard to the method for controlling the power supply system 100.

In step S1, the controller 5 determines whether or not the external power supply 9 is separated from the power supply system 100.

For example, the engagement sensor is provided that detects whether or not the charging port 100a and the external power supply 9 are engaged with a grid, and, when the grid is separated from the charging port 100a, the engagement sensor outputs a disconnection signal that indicates a disconnected state to the controller 5. Once the controller 5 obtains the disconnection signal, the controller 5 determines that the external power supply 9 is separated from the power supply system 100, and switches the switch 3 to the connected state so that power can be supplied to the high voltage battery 1 from the power supply device 4 through the charger 2.

In step S2, when the controller 5 determines that the external power supply 9 is separated from the power supply system 100, the controller 5 causes the DC/DC converter 42 to drive and converts a voltage of output power of the power supply device 4 into an input voltage of the charger 2. The input voltage herein means a voltage value with which the charger 2 is able to carry out a boost operation, and is set to, for example, a voltage value that maximizes an output capacitance of the charger 2.

In step S3, the controller 5 supplies a voltage of power, which is supplied from the DC/DC converter 42, to the high voltage battery 1 through the charger 2. Thus, the high voltage battery 1 is charged with output power of the power supply device 4.

When a residual capacitance of the high voltage battery 1 increases to a predetermined threshold value in order to avoid excessive charge, the controller 5 ends the processing of step S3 by switching the switch 3 to the disconnected state, and then the series of processing procedure regarding the method for controlling the power supply system 100 ends.

According to the first embodiment of the present invention, the power supply system 100 includes the battery 1 that supplies power to the driving unit 10, and the charger 2 that converts a voltage of power input from the external power supply 9 through the charging port 100*a* into a charging voltage required for charge of the battery 1. Further, the power supply device 4 connected between the charging port 100*a* and the charger 2 is included inside the power supply system 100. Concerning "between the charging port 100*a* and the charger 2", this includes the charging port 100*a* itself and the charger 2 itself.

Also, the power supply device 4 is provided with the DC/DC converter 42 as a voltage converter that converts a voltage of power output from the power supply device 4 itself into a voltage corresponding to a voltage of the external power supply 9 that is a voltage value that can be boosted by the charger 2. The power supply device 4 supplies a voltage output from the DC/DC converter 42 to the battery 1 through the charger 2.

As described above, the power supply system 100 uses the DC/DC converter 42 to convert a voltage of output power of the power supply device 4 so that a magnitude of a voltage of power to be output from the power supply device 4 to the charger 2 falls within the input voltage range of the charger 2, and the power supply system 100 supplies the converted voltage to the charger 2. Here, the input voltage range of the charger 2 is designed based on a magnitude of a voltage of the external power supply 9.

Therefore, a voltage of power output from the power supply device 4 is input to the charger 2 through the DC/DC converter 42, and it is thus possible to ensure that the battery 1 is charged with power of the power supply device 4. For example, even in a situation where the battery 1 needs to be charged, and a voltage of an output power of the power supply device 4 is outside the input voltage range of the charger 2, power of the power supply device 4 is supplied to the battery 1, and it is thus possible to ensure that the battery 1 is charged.

Further, since, in the power supply system 100, the charger 2 performs a part of the processing of converting a voltage of the power supply device 4, it is possible to reduce the voltage conversion processing in the DC/DC converter 42. Because of this, it is possible to reduce a volume and cost of the DC/DC converter 42.

Therefore, according to the embodiment, it is possible to suppress the size and cost of the converter that converts a voltage of output power of the power supply device 4 while ensuring that the battery is charged by the power supply device 4 in a situation where the battery needs to be charged.

Furthermore, since the power supply device 4 is connected with the battery 1 through the DC/DC converter 42 and the charger 2, it is possible to avoid a situation where a strong voltage of the battery 1 is applied directly to the power supply device 4. Moreover, since the power supply device 4 is connected with the battery 1 through the charger 2, radiation noise and ripple noise of the driving unit 10 are reduced by the output filter of the charger 2. Therefore, it is possible to restrain radiation noise and ripple noise of the driving unit 10 from being mixed in the DC/DC converter and the auxiliary power supply 41, and it is thus not necessary to provide an output filter on an output terminal side of the DC/DC converter 42, thereby achieving further cost reduction.

Moreover, by using the DC/DC converter 42, it is possible to adjust a voltage value to be input to the charger 2 so that an output capacitance of the charger 2 becomes large, and it is thus possible to use the charger 2 effectively.

As described above, according to the embodiment, by connecting the DC/DC converter 42 between the auxiliary power supply 41 of the power supply device 4 and the charger 2, the battery 1 can be charged efficiently with power of the power supply device 4 while suppressing noise from mixing in the power supply device 4.

Also, according to the embodiment, an output voltage of the DC/DC converter 42 is set to a predetermined value between an input voltage value to the DC/DC converter 42 from the auxiliary power supply 41 and a voltage value required for charge of the battery 1. This means that the DC/DC converter 42 boosts the input voltage to a voltage value within a range from a voltage value that can be boosted by the charger 2 (corresponding to a voltage of the external power supply 9) to a voltage value of the battery 1.

Due to this, the charger 2 performs a part of the boost processing required in boosting an output voltage of the auxiliary power supply 41 up to a voltage value of the battery 1, and it is thus possible to reduce a boosting ratio of the DC/DC converter 42. Since the boosting ratio of the DC/DC converter 42 is reduced, it is possible to decrease a power loss generated in the DC/DC converter and the size and cost of the DC/DC converter 42. As described above, as the charger 2 and the DC/DC converter 42 share the boost processing carried out in the power supply system 100, it is possible to suppress a size and cost of the power supply device 4.

Specifically, the power supply system 100 uses the DC/DC converter 42 to boost a voltage of the auxiliary power supply 41, and uses the charger 2 to further boost the boosted voltage. Because of this, a boosting ratio of an output voltage to an input voltage of the DC/DC converter 42 becomes small, and it is thus possible to suppress a power loss, product cost, and the size of the DC/DC converter 42 in comparison with a configuration in which the DC/DC converter 42 is directly connected with the battery 1. Even with a power supply system in which an input voltage is stepped down by using the DC/DC converter 42 and further adjusted by using the charger 2, it is possible to suppress the product cost and the size of the DC/DC converter 42.

Further, according to the embodiment, the power supply system 100 is mounted on a vehicle. Also, the power supply device 4 supplies power to the battery 1 through the charger 2 while the vehicle is driven. Because of this, operation time of the driving unit 10 such as a motor that drives the vehicle becomes long, and it is thus possible to increase a mileage. Further, as described above, since a weight of the power supply device 4 is reduced, fuel efficiency of the vehicle is improved, thereby further extending a mileage.

Moreover, according to the embodiment, the power supply device 4 further includes a solid oxidation type fuel cell that generates power by receiving fuel supply as the auxiliary power supply 41 for supplementing the battery 1. The DC/DC converter 42 boosts a voltage of the fuel cell and inputs the boosted voltage to the charger 2.

Here, since the solid oxidation type fuel cell is mainly made from ceramics, a difference is larger than a solid polymer type fuel cell and so on. Therefore, as the number of fuel cells laminated increases, a difference of an entire fuel cell stack becomes larger, and adhesion between the fuel cells is thus degraded, thereby causing higher electric resistance. With this reason, the number of solid oxidation type fuel cells to be laminated is limited in comparison with solid polymer type fuel cells, and an output voltage of the fuel cell is often lower than a voltage of the external power supply 9.

As described above, as the power supply device 4 is provided with the solid oxidation type fuel cell of which output voltage is lower than a voltage of output power of the external power supply 9, it is possible to charge the battery 1 with power of the fuel cell through the charger 2 while the vehicle is driven, and it is also possible to suppress the weight and cost of the DC/DC converter 42 that boosts a voltage of the fuel cell. Also, as the weight of the DC/DC converter 42, and thus the weight of the vehicle are reduced, power consumption of the driving unit 10 that drives the vehicle is reduced, thereby suppressing a fuel consumption amount of the fuel cell. Therefore, it is possible to improve fuel efficiency while suppressing the size and cost of the power supply device 4.

Also, according to the embodiment, the output terminal To4 of the DC/DC converter 42 is connected with the input terminal Ti2 of the charger 2. This means that the output terminal To4 of the DC/DC converter 42 is connected between the charging port 100a and the input filter 21. Because of this, it is not necessary to change the configuration of the charger 2, and power output from the power supply device 4 can be input to the charger 2 with a simple configuration.

Furthermore, according to the embodiment, as shown in FIG. 2, when the upper limit voltage of the auxiliary power supply 41 that supplies a voltage of power input to the DC/DC converter 42 is lower than 60V, an insulating converter configures the DC/DC converter 42. Because of this, since insulation on the auxiliary power supply 41 side is ensured, it is not necessary to use, for example, a highly insulating connection cable between the DC/DC converter 42 and the auxiliary power supply 41. Therefore, it is possible to simplify an insulation countermeasure on the auxiliary power supply 41 side, thereby suppressing cost and a size of the power supply device 4.

Further, according to the embodiment, when the upper limit voltage of the auxiliary power supply 41 is equal to or higher than 60V, a non-insulating converter configures the DC/DC converter 42. Because of this, product cost and the size of the DC/DC converter 42 are suppressed, thereby simplifying the configuration of the power supply device 4.

Moreover, according to the embodiment, as shown in FIG. 1, the power supply system 100 further includes the switch 3 that connects or disconnects the charger 2 with or from the power supply device 4.

By connecting the switch 3 between the charger 2 and the power supply device 4, it is possible to ensure that the power supply device 4 is separated from the charger 2. Therefore, it is possible to prevent a voltage from being applied to the external power supply 9 from the power supply device 4 or to prevent a voltage from being applied to the power supply device 4 from the external power supply 9 in a state where the external power supply 9 is connected with the charging port 100a of the power supply system 100.

Further, according to the embodiment, the power supply system 100 is provided with the detector 100b that measures a voltage of power input to the charger 2 from the external power supply 9, and the controller 5 that switches a state of the switch 3 based on an output value of the detector 100b.

Thus, it is possible to prevent the switch 3 from being switched to the connected state in a state where power is supplied to the charger 2 from the external power supply 9. Therefore, it is possible to ensure that the power supply device 4 and the external power supply 9 are protected, and that a user avoids an electric shock.

Second Embodiment

Figure 5:
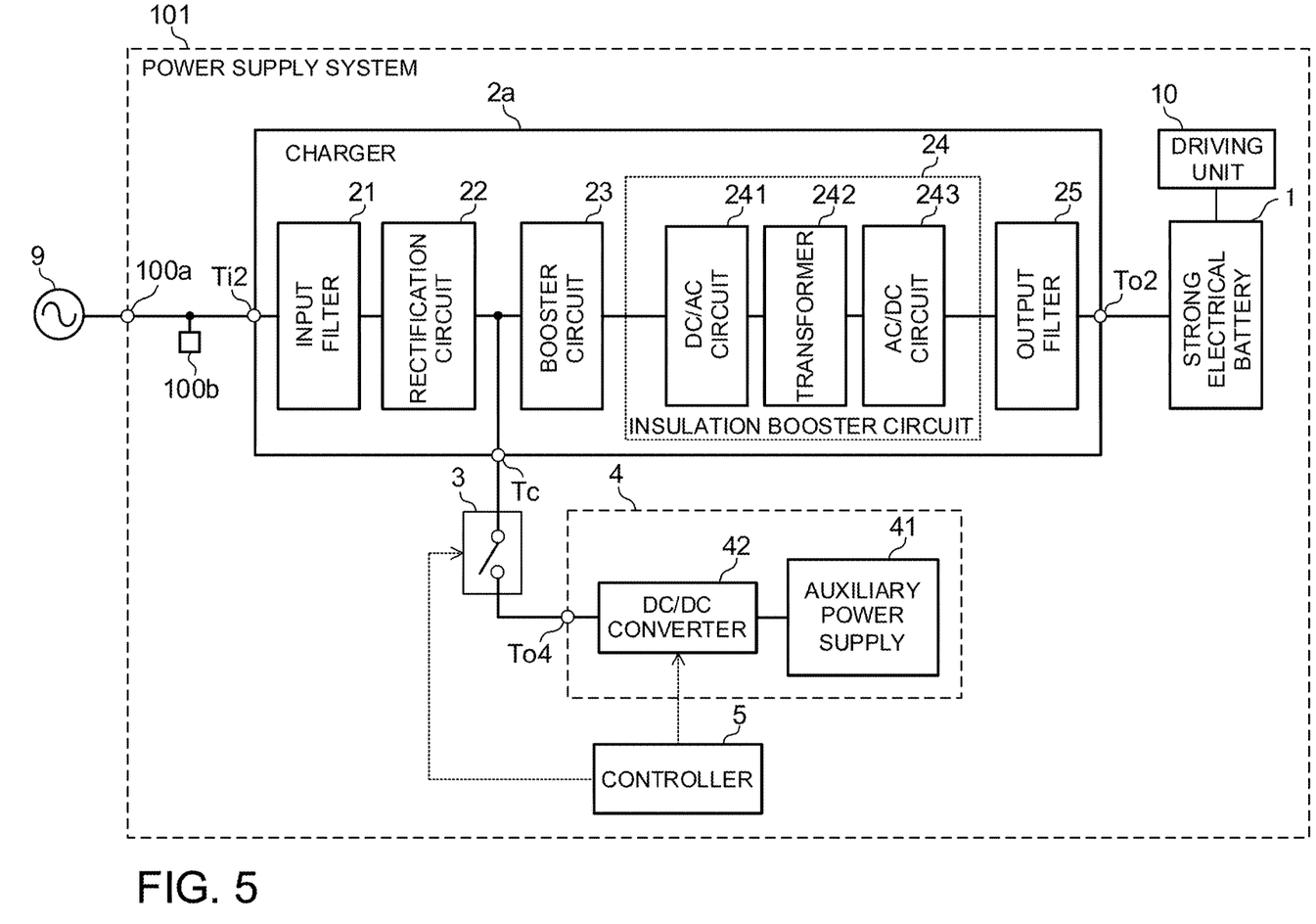
FIG. 5 is a block diagram showing an example of a configuration of a power supply system according to a second embodiment of the present invention.

FIG. 5 is a circuit diagram showing a configuration example of a power supply system 101 according to a second embodiment of the present invention. In the power supply system 101 according to the embodiment, unlike the first embodiment, a DC/DC converter 42 is not connected with an input terminal Ti2 but is connected with an intermediate terminal Tc of a charger 2a.

The power supply system 101 is provided with the charger 2a instead of the charger 2 of the power supply system 100 shown in FIG. 1. The rest of the configuration is the same as the configuration shown in FIG. 1, and therefore the same reference numerals are used and explanation is omitted.

The charger 2a is provided with the intermediate terminal Tc. In the charger 2a, the intermediate terminal Tc is connected with a signal line that connects an output terminal of a rectification circuit 22 with an input terminal of a booster circuit 23. The intermediate terminal Tc of the charger 2a is connected with an output terminal To4 of the DC/DC converter 42 through a switch 3.

As described above, as a voltage of output power of the DC/DC converter 42 is input to the booster circuit 23 of the charger 2a, it is possible to reduce a power loss generated in an input filter 21 and the rectification circuit 22 in comparison with a case where the voltage is input to the input terminal Ti2 of the charger 2a. Therefore, since a loss of power that is supplied to a high voltage battery 1 from a power supply device 4 through the charger 2 is reduced, it is possible to efficiently supply power of the power supply device 4 to the high voltage battery 1.

According to the second embodiment of the present invention, the charger 2a includes the rectification circuit 22 that converts an alternating current voltage of input power into a direct current voltage, and the booster circuit 23 that boosts the direct current voltage output from the rectification circuit 22 to a charging voltage required for charge of the battery 1. The output terminal To4 of the DC/DC converter 42 is connected between the rectification circuit 22 and the booster circuit 23.

Because of this, since output power of the DC/DC converter 42 is input directly to the booster circuit 23 without passing through the rectification circuit 22, it is possible to reduce a power loss generated when the rectification circuit 22 converts an alternating current voltage into a direct current voltage.

In the embodiment, explanation is given regarding the example where the output terminal To4 of the power supply device 4 is connected between the rectification circuit 22 and the booster circuit 23. However, the output terminal To4 of the power supply device 4 may be connected between the booster circuit 23 and the insulation booster circuit 24, or between the input filter 21 and the rectification circuit 22. With these configurations of connection, it is still possible to reduce a boosting ratio of the DC/DC converter 42 because at least a voltage of power input to the insulation booster circuit 24 is boosted. Therefore, it is possible to suppress product cost and a size of the DC/DC converter 42.

Third Embodiment

Figure 6:
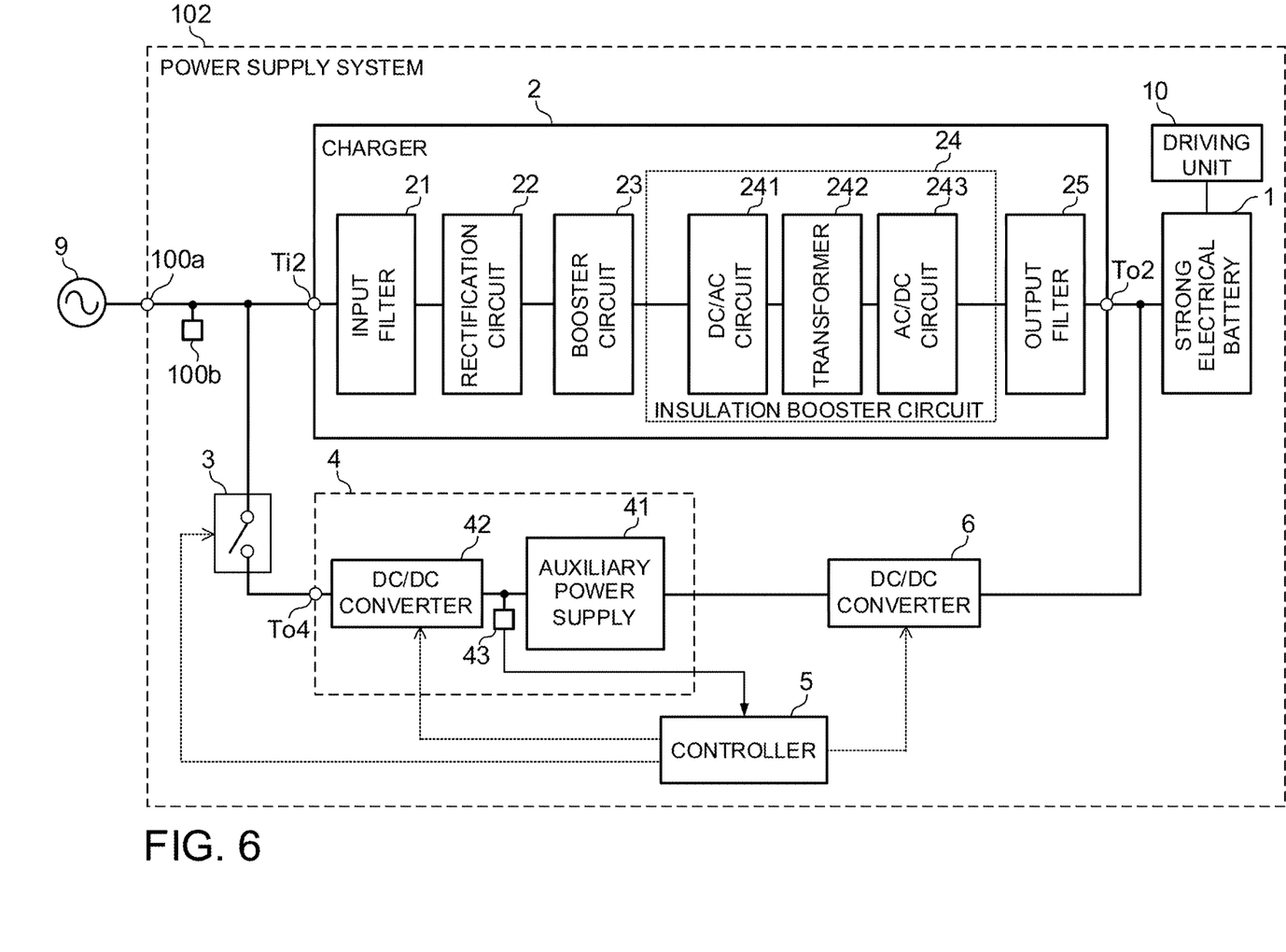
FIG. 6 is a block diagram showing an example of a configuration of a power supply system according to a third embodiment of the present invention.

FIG. 6 is a circuit diagram showing a configuration example of a power supply system 102 according to a third embodiment of the present invention.

The power supply system 102 according to the embodiment is provided with a power detector 43 and a DC/DC converter 6 in addition to the configuration of the power supply system 100 shown in FIG. 1. Since the rest of the configuration is the same as the configuration of the power supply system 100, the same reference numerals are used and explanation is omitted.

The DC/DC converter 6 is connected between an auxiliary power supply 41 and a high voltage battery 1 without passing through a charger 2. The DC/DC converter 6 configures a direct converter that converts a voltage of output power of a power supply device 4 into a voltage required for charge of the high voltage battery 1.

The DC/DC converter 6 according to the embodiment boosts a voltage of output power of the auxiliary power supply 41 to a voltage value required for charge of the high voltage battery 1, and supplies the boosted voltage to the high voltage battery 1. Because of this, the high voltage battery 1 is charged with power generated in the auxiliary power supply 41.

When an upper limit voltage of the auxiliary power supply 41 is lower than 60V, an insulating converter configures the DC/DC converter 6. Meanwhile, when the upper limit voltage of the auxiliary power supply 41 is 60V or higher, a non-insulating converter configures the DC/DC converter 6.

The power detector 43 is connected with an output terminal of the auxiliary power supply 41 and detects output power of the auxiliary power supply 41. Specifically, the power detector 43 detects at least either a voltage or a current of output power of the auxiliary power supply 41.

For example, the power detector 43 detects both an output voltage of the auxiliary power supply 41 and an output current of the auxiliary power supply 41, and outputs a value obtained by multiplying a detection value of the output voltage by a detection value of the output current to a controller 5 as output power of the auxiliary power supply 41.

Alternatively, the power detector 43 may detect a value of either a voltage or a current of output power of the auxiliary power supply 41, and record a table showing a current-voltage characteristics of the auxiliary power supply 41 on a controller 5. In this case, once the controller 5 acquires a detection value from the power detector 43, the controller 5 refers to the table and calculates output power of the auxiliary power supply 41.

Once the controller 5 acquires the output power of the auxiliary power supply 41, the controller 5 determines whether or not the output power acquired exceeds a capacitance threshold value of a charger 2. Here, the capacitance threshold value of the charger 2 is a value that is previously determined in consideration of a error and so on based on a maximum output capacitance of the charger 2, that is an upper limit value of the output capacitance of the charger 2. The maximum output capacitance of the charger 2 is, for example, about several kW (kilowatts).

When the output power of the auxiliary power supply 41 is equal to or lower than the capacitance threshold value of the charger 2, the controller 5 controls an operation of the DC/DC converter 42 so that the output power is supplied to the high voltage battery 1 through the charger 2.

Meanwhile, when the output power of the auxiliary power supply 41 exceeds the capacitance threshold value of the charger 2, the controller 5 controls an operation of the DC/DC converter 6 and supplies surplus power directly to the high voltage battery 1. At the same time, the controller 5 supplies the remaining power to the high voltage battery 1 through the DC/DC converter 42.

As described above, when the output power of the auxiliary power supply 41 exceeds the capacitance of the charger 2, the surplus is supplied directly to the high voltage battery 1 through the DC/DC converter 6. Thus, it is possible to supply all of the output power of the auxiliary power supply 41 to the high voltage battery 1 while effectively using the output capacitance of the charger 2.

When the output power of the auxiliary power supply 41 is equal to or lower than the capacitance threshold value of the charger 2, the controller 5 according to the embodiment may supply the output power of the auxiliary power supply 41 to the high voltage battery 1 through the DC/DC converter 6 only. Because of this, it is possible to reduce a power loss associated with voltage conversion in the power supply system 102 by a power loss generated in the DC/DC converter 42 and the charger 2.

As described above, the controller 5 stops an operation of either one of the DC/DC converter 6 and the DC/DC converter 42 depending on a level of the output power of the auxiliary power supply 41, and operates the other one of the DC/DC converter 6 and the DC/DC converter 42 only, thereby reducing a power loss of the one of the DC/DC converters.

Alternatively, when the output power of the auxiliary power supply 41 exceeds the capacitance threshold value of the charger 2, the controller 5 may calculate a distribution ratio so that a total power loss of the DC/DC converter 6 and the DC/DC converter 42 becomes small, and control operations of both the DC/DC converter 6 and the DC/DC converter 42.

According to the third embodiment of the present invention, the power supply system 102 further includes the DC/DC converter 6 that configures a direct converter that converts a voltage of output power of the power supply device 4 into a voltage of the battery 1. When the output power of the power supply device 4 exceeds a capacitance of the charger 2, the controller 5 of the power supply system 102 supplies the surplus power directly to the battery 1 from the power supply device 4 through the DC/DC converter 6.

As described above, when output power of the power supply device 4 exceeds the capacitance of the charger 2, the DC/DC converter 6 is used to supply a part of the output power to the battery 1, thereby storing all power of the power supply device 4 in the battery 1 while effectively using the charger 2.

Moreover, according to the embodiment, when output power of the power supply device 4 is equal to or lower than the capacitance of the charger 2, the controller 5 supplies the output power of the power supply device 4 to the battery 1 through either one of the DC/DC converters 6 and 42. Thus, it is possible to reduce a power loss of the one of the converters, thereby reducing a power loss associated with voltage conversion in the power supply system 102.

Although the embodiments of the present invention have been explained above, the embodiments only represent a part of application examples of the present invention, and are not intended to limit the technical scope of the present invention to specific configurations of the foregoing embodiments.

For example, there may be a configuration where a charger 2 steps down a voltage of power input from an external power supply 9 and charges a weak electrical battery, and a DC/DC converter 42 steps down a voltage of output power of an auxiliary power supply 41 to a voltage within a range of a voltage that can be input to the charger 2. Even with such a configuration, it is possible to efficiently store power of the auxiliary power supply 41 in the weak electrical battery while reducing noise from the weak electrical battery.

Further, in the foregoing embodiments, the switch 3 is disposed between the charger 2 and the power supply device 4, but the switch 3 may be omitted. Even with such a configuration, it is possible to obtain an effect similar to those of the foregoing embodiments. In this case, the controller 5 controls an operation of the DC/DC converter 42 so that input from the power supply device 4 to the charger 2 is stopped.

The foregoing embodiments may be combined as appropriate.

The invention claimed is:

1. A power supply system provided with a battery, and a charger that converts a voltage of power input from an external power supply through a charging port into a voltage required for charge of the battery, comprising:
    an intra-system power supply device that is connected between the charging port and the charger, wherein the charger includes:
    a rectification circuit that converts an alternating current voltage of the input power into a direct current voltage; and
    a booster circuit that boosts the direct current voltage toward a voltage of the battery, wherein
    the power supply device is provided with a voltage converter that converts a voltage of output power of the power supply device into a voltage corresponding to a voltage of the external power supply, and
    an output terminal of the voltage converter is connected between the rectification circuit and the booster circuit.

2. A power supply system provided with a battery, and a charger that converts a voltage of power input from an external power supply through a charging port into a voltage required for charge of the battery, comprising:
    an intra-system power supply device that is connected between the charging port and the charger; and
    a direct converter that converts a voltage of output power of the power supply device into a voltage of the battery, wherein
    the power supply device is provided with a voltage converter that converts the voltage of the output power of the power supply device into a voltage corresponding to a voltage of the external power supply, and
    when output power of the power supply device exceeds a capacitance of the charger, power is supplied to the battery from the power supply device through the direct converter.

3. The power supply system according to claim 1, wherein the voltage converter boosts the voltage of the output power of the power supply device to a voltage value within a range from a voltage corresponding to the voltage of the external power supply to a voltage of the battery.

4. The power supply system according to claim 2, wherein the voltage converter boosts the voltage of the output power of the power supply device to a voltage value within a range from a voltage corresponding to the voltage of the external power supply to a voltage of the battery.

5. The power supply system according to claim 1, wherein,
    the power supply system is mounted on a vehicle, and
    the power supply device supplies power to the battery through the charger while the vehicle is being driven.

6. The power supply system according to claim 2, wherein,
    the power supply system is mounted on a vehicle, and
    the power supply device supplies power to the battery through the charger while the vehicle is being driven.

7. The power supply system according to claim 1, wherein
    the power supply device further includes a solid oxidation type fuel cell that receives supply of fuel and generates power, and
    the voltage converter boosts a voltage of output power of the fuel cell and inputs the boosted voltage to the charger.

8. The power supply system according to claim 2, wherein
    the power supply device further includes a solid oxidation type fuel cell that receives supply of fuel and generates power, and
    the voltage converter boosts a voltage of output power of the fuel cell and inputs the boosted voltage to the charger.

9. The power supply system according to claim 1, wherein
    the voltage converter is connected with an input terminal of the charger.

10. The power supply system according to claim 2, wherein
    the voltage converter is connected with an input terminal of the charger.

11. A power supply system provided with a battery, and a charger that converts a voltage of power input from an external power supply through a charging port into a voltage required for charge of the battery, comprising:
    an intra-system power supply device that is connected between the charging port and the charger; and
    a direct converter that converts a voltage of output power of the power supply device into a voltage of the battery, wherein
    the power supply device is provided with a voltage converter that converts the voltage of the output power of the power supply device into a voltage corresponding to a voltage of the external power supply, and
    in the power supply device, when an upper limit voltage of an auxiliary power supply that supplies a voltage of power input to the voltage converter is lower than 60V, an insulating converter configures the voltage converter.

12. A power supply system provided with a battery, and a charger that converts a voltage of power input from an external power supply through a charging port into a voltage required for charge of the battery, comprising:
    an intra-system power supply device that is connected between the charging port and the charger; and
    a direct converter that converts a voltage of output power of the power supply device into a voltage of the battery, wherein the power supply device is provided with a voltage converter that converts the voltage of the output power of the power supply device into a voltage corresponding to a voltage of the external power supply, and in the power supply device, when an upper limit voltage of an auxiliary power supply that supplies a voltage of power input to the voltage converter is 60V or higher, a non-insulating converter configures the voltage converter.

13. The power supply system according to claim 1, further comprising
    a switch that connects or disconnects the charger with or from the power supply device.

14. The power supply system according to claim 2, further comprising
    a switch that connects or disconnects the charger with or from the power supply device.

15. The power supply system according to claim 11, further comprising
    a switch that connects or disconnects the charger with or from the power supply device.

16. The power supply system according to claim 12, further comprising
    a switch that connects or disconnects the charger with or from the power supply device.

17. The power supply system according to claim 13, comprising:
    a sensor that measures or estimates a voltage of power input to the charger from an external power supply; and
    a controller that switches a state of the switch based on an output value of the sensor.

18. The power supply system according to claim 14, comprising:
    a sensor that measures or estimates a voltage of power input to the charger from an external power supply; and
    a controller that switches a state of the switch based on an output value of the sensor.

19. The power supply system according to claim 15, comprising:
    a sensor that measures or estimates a voltage of power input to the charger from an external power supply; and
    a controller that switches a state of the switch based on an output value of the sensor.

20. The power supply system according to claim 16, comprising:
    a sensor that measures or estimates a voltage of power input to the charger from an external power supply; and
    a controller that switches a state of the switch based on an output value of the sensor.

21. The power supply system according to claim 2, wherein,
    when the output power of the power supply device is equal to or smaller than the capacitance of the charger, the output power is supplied to the battery through either one of the voltage converter and the direct converter.

* * * * *